(12) United States Patent
Cheng et al.

(10) Patent No.: US 8,028,324 B2
(45) Date of Patent: Sep. 27, 2011

(54) METHOD FOR TRANSMITTING POLICY INFORMATION BETWEEN NETWORK EQUIPMENT

(75) Inventors: Rong Cheng, Guangdong (CN); Qingquan Shi, Guangdong (CN); Yuelin Hu, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1046 days.

(21) Appl. No.: 11/587,992

(22) PCT Filed: Jun. 3, 2005

(86) PCT No.: PCT/CN2005/000781
§ 371 (c)(1),
(2), (4) Date: Apr. 20, 2007

(87) PCT Pub. No.: WO2005/119968
PCT Pub. Date: Dec. 15, 2005

(65) Prior Publication Data
US 2008/0010666 A1    Jan. 10, 2008

(30) Foreign Application Priority Data
Jun. 3, 2004   (CN) .......................... 2004 1 0037136

(51) Int. Cl.
*G06F 17/00* (2006.01)
*G06F 15/173* (2006.01)
*G06F 11/00* (2006.01)
*G01R 31/08* (2006.01)
*H04L 12/28* (2006.01)
*H04W 36/12* (2009.01)
*H04L 9/00* (2006.01)

(52) U.S. Cl. .............. 726/1; 726/22; 709/223; 370/230; 370/351

(58) Field of Classification Search ................ 726/1, 22; 709/223; 370/351, 230
See application file for complete search history.

(56) References Cited

U.S. PATENT DOCUMENTS
7,193,965 B1 * 3/2007 Nevo et al. .................... 370/230
(Continued)

FOREIGN PATENT DOCUMENTS
EP       1298844 A1    4/2003
(Continued)

OTHER PUBLICATIONS

Jian Wang; Jian Gu; Fang Mei; Zhe Zhang; Yanheng Liu; "One New BRAS Model Based on Trusted Network", Electronic Commerce and Security, 2008 International Symposium on Digital Object Identifier: 10.1109/ISECS.2008.62 Publication Year: May 2008, pp. 398-401.*

(Continued)

*Primary Examiner* — Eleni Shiferaw
*Assistant Examiner* — Courtney D Fields
(74) *Attorney, Agent, or Firm* — Conley Rose, P.C.; Grant Rodolph

(57) ABSTRACT

A method for transmitting policy information between network equipment, extending protocol types of messages in layer-2, layer-3 or a higher application layer between an IP-uplink broadband user access equipment and a BRAS so as to construct a PITP to bear policy information; a PITP message includes a policy information transmission type field, an operation type field and a policy information content field, and different types of policy information are distinguished by the policy information transmission type field; transmission of the policy information is implemented through a point-to-point means or a broadcast means in layer-2, a unicast or a multicast in layer-3 or a higher application layer. The present invention implements policy information transmission, prevents account intrusions and hacker attacks, makes it convenient for the broadband user access equipment to implement dynamic QoS policy adjustment in terms of different users and makes it easy for integrated managing the online equipment.

20 Claims, 2 Drawing Sheets

U.S. PATENT DOCUMENTS

| | | | |
|---|---|---|---|
| 2002/0194323 A1* | 12/2002 | Chantrain et al. | 709/223 |
| 2003/0105825 A1 | 6/2003 | Kring et al. | |
| 2003/0135556 A1 | 7/2003 | Holdsworth | |
| 2003/0169689 A1 | 9/2003 | Chavali | |
| 2004/0223602 A1* | 11/2004 | Honkasalo et al. | 370/351 |

FOREIGN PATENT DOCUMENTS

| | | |
|---|---|---|
| WO | 2004006503 A1 | 1/2004 |
| WO | WO 2010051853 A1 * | 5/2010 |

OTHER PUBLICATIONS

Foreign communication from a counterpart application, Chinese application 200410037136.6, Office Action dated Jul. 14, 2006, 4 pages.

Foreign communication from a counterpart application, Chinese application 200410037136.6, Partial English Translation Office Action dated Jul. 14, 2006, 3 pages.

Foreign communication from a counterpart application, European application 05757292.7, Office Action dated May 29, 2007, 4 pages.

Foreign communication from a counterpart application, European application 05757292.7, Office Action dated Feb. 19, 2008, 5 pages.

Foreign communication from a counterpart application, India application 3937/CHENP/2006, Office Action dated Sep. 1, 2008, 3 pages.

Foreign communication from a counterpart application, PCT application PCT/CN2005/000781, English Translation Written Opinion dated Jun. 3, 2004, 3 pages.

* cited by examiner

METHOD FOR TRANSMITTING POLICY INFORMATION BETWEEN NETWORK EQUIPMENT

CROSS-REFERENCE TO RELATED APPLICATIONS

This is a national stage of International Application No. PCT/CN2005/000781, filed on Jun. 3, 2005, which claims priority of Chinese Patent Application No. 200410037136.6, filed Jun. 3, 2004, the disclosure of each application is hereby incorporated by reference in their entirety.

FIELD OF THE INVENTION

The present invention relates to the field of communication technology, and more particularly to a method for transmitting policy information between network equipment such as a Digital Subscriber Line Access Multiplexer (DSLAM) and a Broadband Remote Access Server (BRAS).

BACKGROUND OF THE INVENTION

With the fast development of the Internet, the number of broadband network users is increasing rapidly. During the procedure of the operators constructing the broadband networks, networking mode has developed from Asynchronous Transfer Mode Digital Subscriber Line Access Multiplexer (ATM DSLAM) to Internet Protocol Digital Subscriber Line Access Multiplexer (IP DSLAM). The uplink of the ATM DSLAM adopts a DSLAM with ATM ports, while the uplink of the IP DSLAM adopts a DSLAM with GE ports or FE ports. Edge service nodes connecting to the DSLAM uplink is Broadband Remote Access Server (BRAS).

With the ever-increasing network scale and the increasing number of network users, security problems are becoming more and more severe. Account intrusions and hacker attacks are becoming more and more intense. In addition, with the prevalence of online movies, video services, online games and IP phones, the requirement for broadband and real-time services are becoming higher and higher, so it is more and more important for the operators to provide different services according to different users or different applications. Therefore, it is an urgent issue for the operators to manage and maintain the online equipment simply, conveniently and efficiently. However, at present the DSLAM cannot communicate with such equipment as the BRAS or policy servers, so other problems will be brought in while resolving the above-mentioned problems. The solutions for solving network security problems, Quality of Service (QoS) implementations, multicast videos, network management and so on, as well as the accompanying problems, will be described in detail.

In terms of the network security problem of the hacker attacks, the primary means in the broadband equipment is to quarantine the user to interdict the user from affecting other users, so that damages to the users are confined in a very small scope. In a DSLAM network framework that adopts the ATM-uplink, the general adopted means is to establish a Permanent Virtual Channel (PVC) from the DSLAM to the BRAS for each Asymmetric Digital Subscriber Line (ADSL) user, so that different PVCs are quarantined; in an IP DSLAM network framework, the general adopted means is to allocate a Virtual Local Area Network Identity (VLAN ID) for each user, so that different users are interdicted from visiting one another.

In terms of the network security problem of the account intrusions, the present solution is to bind the account with a port identity and authenticate the legality of the user with the cooperation of a Remote Authentication Dial-In User Service (RADIUS) Server. The port identity of a user is the PVC of the user in the ATM DSLAM; and is the VLAN ID of the user in the IP DSLAM. The PVC of the user or the VLAN ID of the user identifies a unique actual online user. The BRAS captures the authentication message of the user, takes out the account information of the user and sends the account information together with the port information of the user to the RADIUS Server; the RADIUS Server determines whether the account information and the port identity are legal so as to decide whether the user can log on to the network. The port information of the user is the VLAN ID or the Virtual Path Identifier (VPI) and Virtual Channel Identifier (VCI) of the PVC.

The above-mentioned solutions for network security problems in terms of hacker attacks or account intrusions all need to use the user PVC of the ATM DSLAM or VLAN ID of the IP DSLAM. The number of PVC in the ATM DSLAM is determined by the values of VPI and VCI. According to the definition of VPI and VCI in an ATM Cell, at the user network side, VPI is 8-bit while VCI is 16-bit, so 256 (the number of VPI)×65536 (the number of VCI)=16777216 users are supported. The supported number of the users completely satisfies the quantity requirement of the users accessing the DSLAM, so that the user is uniquely identified by using PVC and thus account intrusions and hacker attacks are prevented by using PVC.

However, in terms of the IP DSLAM, most of the networking modes adopting IP DSLAM uplinks are: FE or GE interface uplinks access to BRAS through GE interfaces after being aggregated by LAN Switches. VLAN ID is currently defined as 12-bit and supports 4096 users at most. In other words, if each user is allocated with a VLAN ID, there will be at most 4096 users aggregated at an GE interface; when there are more than 4096 user ports, multiple users will certainly share one VLAN ID, so it is impossible either to avoid hacker attacks by setting a unique VLAN ID for each user, or to avoid account intrusions by binding the VLAN ID with the user account.

The physical port of each user connected to the DSLAM is unique. If a user can be identified through his physical port, the ports and users will be mapped one by one no matter how many users there are. But the current BRAS cannot acquire the physical port information and thus cannot solve the problem of account intrusions by bonding the physical port with the user account.

Similarly, if a user can be identified by his physical port and the physical port of the user can be bound with information such as the address of the user, the problem of hacker attacks can be solved by monitoring whether the user is a hacker through the binding relation. But the current BRAS cannot acquire the physical port information to avoid hacker attacks by bonding the physical port with the address information.

Services like video services, online movies and VoIP demand that network equipment provide different services in terms of different applications, i.e. implement QoS functions. At present, there are two ways to provide QoS bandwidth guarantee, which are Integrated Service and Differentiated Service.

1. Integrated Service needs to apply for a specific service from the network before sending traffic, and the application is performed by the signaling. Service application programs, such as a VoIP telephone client program, a VOD client program and so on, transmit their own flow parameter and the required specific QoS request to the network through the signaling. The specific QoS request includes bandwidth, delay and so on; the client service application program sends the traffic after receiving a confirmation from the network, i.e. after the network has reserved some certain resources for the service application program; the traffic sent by the service application program should be controlled within the scope described by the flow parameter.

2. Differentiated Service is different from Integrated Service. Signaling is not necessary in Differentiated Service, in other words, the service application program does not need to notify the network before sending out the traffic. According to Differentiated Service, the network only needs to provide service for each message according to the preset service policy or according to the priority of the message entering the network, rather than maintain the status for every flow.

As a multi-service edge node, a BRAS needs to receive Access Control List (ACL) rules and QoS policies that are issued by such policy servers like a RADIUS Server. The BRAS performs QoS policy control upon the received user message according to the received ACL rule and QoS policy. Because QoS is a kind of service based on end-to-end mode, the DSLAM also needs to perform priority control and management of the bandwidth, the delay and the jitter according to the type of the message service. In other words, the DSLAM needs to obtain and process the ACL rule and QoS policy information accordingly. But as layer-2 equipment, the DSLAM is mainly used for aggregating the user ports and transparently transmitting messages from the user ports, and the service processing ability of the DSLAM is too weak to perform policy information interactions with such equipment as policy servers. If the DSLAM is going to support QoS function relying on Integrated Service, the DSLAM needs to run such protocols as QoS resource reserve protocol, which are all based on layer-3 or higher layer protocols and which demand the DSLAM receive and process related protocol messages, but the DSLAM is the layer-2 equipment and the current DSLAM cannot satisfy the above-mentioned requirement; as to Differentiated Service, the DSLAM has to configure ACL and QoS policy by itself, which obviously makes it impossible to implement dynamic QoS policy adjustment according to different users. Obviously, if the BRAS can transmit the ACL rule and QoS policy information to the DSLAM, the above-mentioned problems can be solved.

As a very important service in Triple-play services, the IP TV multicast video service can be implemented by several measures in the existing IP DSLAM-based broadband access network.

1. an IP DSLAM supports IGMP snooping, and a BRAS provides IGMP proxy function. The multicast authority of a user is transmitted to the BRAS through network Element Management System (EMS) or a policy server as a RADIUS Server, and the user authority control is performed in the BRAS. Multicast copy can be implemented through the IP DSLAM that supports IGMP;

2. an IP DSLAM supports IGMP proxy, the multicast authority of a user is directly sent to the IP DSLAM through EMS. The user authority control is performed in the IP DSLAM and multicast copy can also be implemented through the IP DSLAM;

3. an IP DSLAM does not support IGMP protocol, and a BRAS provides IGMP proxy function. The multicast authority of a user is controlled in the BRAS and multicast copy can only be implemented in the BRAS based on the users. The IP DSLAM cannot provide multicast copy function.

Among the above-mentioned three measures, the first measure is applicable basically.

As to the second measure, the operator may utilize an existing RADIUS Server in the network to store the multicast authority information, and the multicast authority information is uniformly issued to the DSLAM by the RADIUS Server instead of being directly issued through EMS. But the existing RADIUS Server in the network generally interacts with the BRAS rather than with the DSLAM, so the existing mechanism cannot transmit the multicast authority information to the DSLAM from the Radius Server.

As to the third measure, the IP DSLAM has no multicast copy function and the copy can only be executed by the BRAS. If more than one user belonging to a same IP DSLAM apply for a same program, the BRAS will copy the same video data flow for multiple times and then transmit the copies to the users. The solution is not accordant with the original intention of the multicast copy mechanism and may lead to severe bandwidth waste of the access network. One solution improving the third measure is that the BRAS transmits the multicast copy information to the IP DSLAM, so that the IP DSLAM will complete the last level copy. The advantage of the improved solution is that the IP DSLAM needs not to support and detect IGMP protocol messages and thus the requirement for the performance of IP DSLAM is not that high.

Besides, the management upon a DSLAM mostly adopts a network manager mode or a command line mode. Either the network manager mode or the command line mode is adopted, each DSLAM needs to occupy a management IP address; as to the command line mode, the management upon a DSLAM demands logging in to the DSLAM to perform operations; while for the network manager mode, each DSLAM is represented as an independent network element in a network manager terminal, and the management is performed in terms of every element. The above-mentioned modes of managing each DSLAM are called distributive management. Obviously, the distributive management will lead to a waste of IP addresses and the management is inconvenient, thus the cost of maintenance and operation is increased.

To sum up, because of the lack of corresponding protocols between the network equipment, i.e. between a BRAS and a DSLAM, useful information can not be transferred, the above-mentioned various solutions causing the above problems have to be adopted.

SUMMARY OF THE INVENTION

Therefore, the present invention provides a method for transmitting policy information between network equipment so as to implement the transmission of policy information between network equipment.

Based on the policy information transmission method, the present invention also solves security problems of account intrusions and hacker attacks, inconvenience in network equipment management and inconvenience in QoS implementation; the present invention makes multicast authority information be transmitted to a DSLAM from policy servers, and makes a DSLAM be able to obtain the multicast copy information.

The present invention provides a technical solution as follows:

A method for transmitting policy information between network equipment, includes:

adding a Policy Information Transfer Protocol (PITP) type by extending protocol types of protocol messages on a layer between broadband user access equipment and a Broadband Remote Access Server (BRAS);

transmitting, by the BRAS, the policy information to the broadband user access equipment with a PITP message; and confirming, by the broadband user access equipment, that the received message is the PITP message sent to the broadband user access equipment, and obtaining the policy information in the PITP message.

The step of extending the protocol types of the protocol messages between the broadband user access equipment and the BRAS includes:

extending the protocol types of protocol messages in layer-2 with a point-to-point means or a layer-2 broadcast means; or extending the protocol types of protocol messages in layer-3 or a higher layer with a unicast means or a broadcast means.

The PITP message includes:

a policy information transmission type field for distinguishing policy information transmission types, an operation type field for distinguishing operation types and a policy information content field for bearing the policy information.

The broadband user access equipment is IP-uplink broadband user access equipment, which is a Digital Subscriber Line Access Multiplexer or a layer-2 switch.

The present invention provides a method for transmitting policy information between broadband network equipment, which is independent from other protocols and can be applied independently or together with other protocols to implement a certain function. The invention can be implemented through a point-to-point means or a broadcast means at layer-2; and the policy information acquirement or transmission can be implemented through a unicast or a broadcast in layer-3 or higher application layers.

In accordance with the present invention, PITP is adopted to transmit the physical port information of the user between IP-uplink broadband user access equipment, e.g. a DSLAM or a layer-2 switch, and a BRAS. On receiving the PITP port information request message, IP-uplink broadband user access equipment encapsulates physical port information of the specified user in a PITP response message and returns the response message to a BRAS; the BRAS records the network port information of the user and then transmits the network port information together with the user account information to a RADIUS Server through a RADIUS message for authentication; since the RADIUS Server is configured with the bonding relation between user accounts and physical ports, it is very easy to determine the validity of the user according to the user account information and the port information carried in the RADIUS authentication message. The present invention solves the problem of insufficient VLAN ID resource in the IP DSLAM with IP-uplink and avoids user account intrusions and hacker attacks.

The present invention also solves the problem that IP-uplink broadband user access equipment cannot obtain the bandwidth and QoS policy information while implementing the QoS function, so that the IP-uplink broadband user access equipment cannot implement dynamical QoS policy adjustment in terms of the users. The BRAS can transmit the QoS policy information of the IP-uplink broadband user access equipment through PITP, therefore, there is no high requirement upon the IP-uplink broadband user access equipment and dynamical QoS policy adjustment in terms of the users can be conveniently implemented.

The present invention also solves the problem that, in the IP TV multicast video solution, when broadband user access equipment acts as an IGMP proxy, multicast authority information cannot be transmitted to the broadband user access equipment integrated from an RADIUS Server; in addition, when the broadband user access equipment does not support IGMP, the problem of severe bandwidth waste caused by the multiple flow copy in a BRAS is also solved.

In accordance with the invention, command line or network manager configuration information of broadband user access equipment is transmitted through PITP between a BRAS and IP-uplink broadband user access equipment, so that the BRAS can perform centralized management upon the broadband user access equipment. It is very convenient to manage broadband user access equipment and the maintenance cost is saved accordingly. Other policy information transmission can also be conveniently transmitted between IP-uplink broadband user access equipment and the BRAS.

The broadband user access equipment can be not only IP-uplink but also ATM-uplink. The IP-uplink broadband user access equipment can be either a DSLAM or a layer-2 switch.

DETAILED DESCRIPTION OF EMBODIMENTS

The present invention will be illustrated in detail hereinafter with reference to the accompanying drawings and embodiments.

Figure 1:
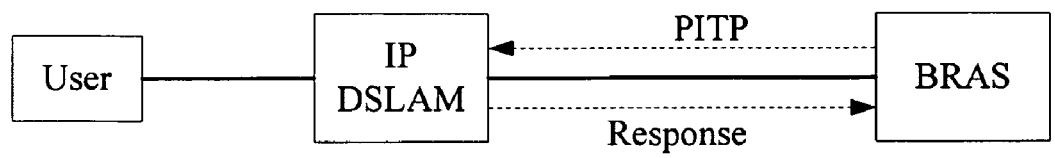
FIG. 1 is a schematic diagram illustrating the method for transmitting policy information when a DSLAM and a BRAS are directly connected.

As shown in FIG. 1, an embodiment of the present invention provides a transmission method for transmitting policy information between broadband user access equipment and a BRAS. The transmission method is abbreviated as the Policy Information Transmission Protocol (PITP), and then the policy information is transmitted between the broadband user access equipment and the BRAS with the PITP. The PITP is obtained by extending the protocol types of the original protocols of each layer. The policy information is anyone of physical port information of a user, QoS policy-related information, multicast authority information, multicast copy information, configuration and maintenance information of user data and so on; surely other information can also be transmitted according to specific requirement. The broadband user access equipment can be IP-uplink or ATM-uplink. The IP-uplink broadband user access equipment can be a DSLAM or a layer-2 switch.

To distinguish different types of policy information, a field of policy information transmission type is set according to the PITP. If the length of the policy information transmission type field is two bytes, 65535 policy types can be identified. Different policy information types can be identified by 0x0001, 0x0002 and 0x0003 based on the setting; furthermore, other identities can be extended to identify different types of policy information. In addition, a field of operation type is set to distinguish types of a current operation. The operation type field can be defined according to the policy information transmission type. For instance, when the policy information transmission type is the broadband user port information which needs request and response operations, a field value of request and a field value of response can be defined for the operation type field. A field of policy information content is also set to transmit the content of the policy information.

The PITP provided by an embodiment of the present invention is independent from any other protocols and can be applied independently. For example, the transmitting end can just send a PITP message to obtain some certain policy information on demand; the PITP can also be applied together with other protocols to implement a certain function, for example, the transmitting end sends a PITP message when the other protocols need some certain policy information. After obtaining the policy information through the PITP message, a corresponding process is executed according to the other protocols. The PITP can be implemented through a point-to-point means or a broadcast means in layer-2; and the acquirement or transmission of the policy information can be implemented through a unicast or a broadcast in layer-3 or higher application layers. No matter in which layer the adopted protocol is, the protocol type of corresponding layer messages needs to be extended so as to define a new protocol message to bear the content of PITP messages. For instance, a layer-2 mode based on Ethernet needs to extend the Ethernet type, while a layer-3 mode based on IP needs to extend the protocol type in the IP packet header. The specific description is as follows:

1. As to the layer-2 point-to-point means, there are two kinds of networking modes:

(1) As shown in FIG. 1, a DSLAM and a BRAS are connected directly.

Figure 2:
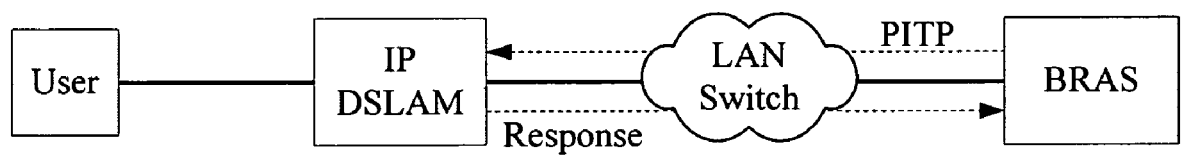
FIG. 2 is a schematic diagram illustrating the method for transmitting policy information when a DSLAM is aggregated to a BRAS through a aggregation equipment.

(2) As shown in FIG. 2, a DSLAM is aggregated to a BRAS through an LAN Switch. The PITP can also be run between the BRAS and the LAN Switch directly connected to the user side; and then the aggregation LAN Switch transparently transmit the protocol message, so as to implement the transmission of the protocol message between the DSLAM and the BRAS.

No matter which mode is adopted, the receiving end of PITP needs to confirm whether the current received PITP message is sent to the receiving end itself. Therefore, as to mode (1), the receiving end of PITP, i.e. the DSLAM or the BRAS, needs to know the layer-2 address information of the counterpart receiving end so as to construct a layer-2 message header. For instance, the BRAS needs to set the layer-2 MAC address information of the DSLAM inside the message header, so that the DSLAM can confirm whether the message is sent to the DSLAM itself according to the MAC address. As to mode (2), an equipment identity is defined to uniquely identify DSLAMs so that messages corresponding to different DSLAMs can be isolated from one another. Specifically speaking, as to a ATM network, a PVC can be established between the DSLAM and the BRAS to transmit the policy information message; while in an Ethernet, a VLAN ID is utilized to identify a DSLAM. The binding relation between the VLAN IDs and the DSLAMs can be one-to-one or multiple-to-one, except that the VLAN IDs of the DSLAMs accessing a same BRAS port can not be the same. It can be seen from the above description that, the VLAN ID in the PITP according to an embodiment of the present invention is used to identify the DSLAM.

Of course, the receiving end needs to confirm not only whether the message is sent to the receiving end itself, but also whether the message is a PITP message. The receiving end determines whether the message is a PITP message according to the protocol type in the message.

2. As to a layer-2 broadcast means, there are also the above-mentioned two networking modes. The primary difference from the layer-2 point-to-point means is that the target address of the PITP request message is a broadcast address. As a receiving end of a broadcast message, the DSLAM needs to not only analyze the protocol type of each received broadcast message so as to determine whether the protocol type is the PITP and determine the transmission information type of the message, but also determine whether the user address carried in the policy information content field of the message is an underlying address of the DSLAM itself. If the user address carried in the policy information content field of the message is an underlying address of the DSLAM itself, the DSLAM processes the message according to the PITP; otherwise, the DSLAM will discard the message. As to a Ethernet, the user address is a MAC address.

3. When layer-3 or a higher application layer is used to bear the PITP, the implement means is similar to that of the layer 2. As to the layer-3 or the higher application layer, when the broadcast mode is adopted, if the IP address of a user is already known, the IP address of the user can be set in the policy information content field of PITP message. After that, the DSLAM determines whether to receive the message according the IP address.

Figure 3:
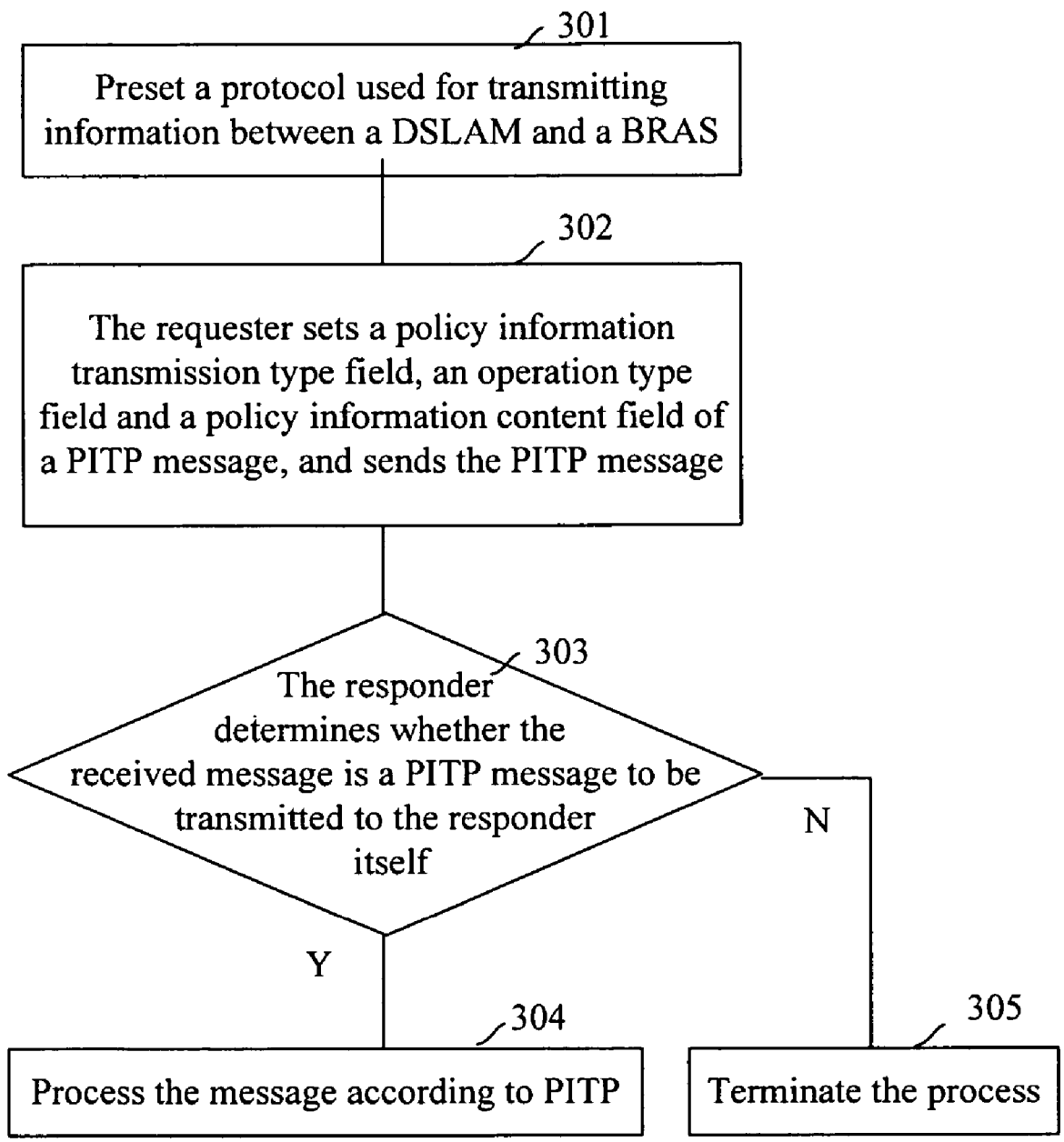
FIG. 3 is a flowchart illustrating a process of transmitting policy information between a DSLAM and a BRAS.

As to the above-mentioned means, the layer-2 point-to-point means is the most preferable, the layer-2 broadcast means is less preferable, and layer-3 point-to-point means and the layer-3 broadcast mode are the least preferable. Taking the embodiment that a DSLAM and a BRAS are connected directly and a layer-2 point-to-point means is adopted, the implementing process will be described hereinafter. The implementing process is shown in FIG. 3, which includes the following steps.

Step 301: a protocol, which is used for transmitting information between the DSLAM and the BRAS, is preset.

As illustrated above, the messages in the protocol can be obtained by extending layer-2 Ethernet messages, so PITP message is corresponding to a new protocol type. The message can include a policy information transmission type field, an operation type field and a policy information content field.

Step 302: while transmitting a PITP message, the transmitting end sets the policy information transmission type of the PITP in the policy information transmission type of the PITP message on demand, and then sets the policy information to be transmitted in the policy information content field.

Step 303~305: on receiving the message, the receiving end determines whether the message is a PITP message to be transmitted to the receiving end itself, if the message is a PITP message to be transmitted to the receiving end itself, the receiving end processes the message according to the PITP; otherwise, the receiving end terminates the current process.

The receiving end can determine whether the message is a PITP message according to the protocol type of the message, and determine whether the message is sent to the receiving end itself according to the receiving end address information in the message header.

The specific process of the receiving end processing the message according to the PITP is to determine the type of the policy information transmitted by the message according to the policy information transmission field of the message, obtain the policy information from the policy information content field, determine whether the message is a request message, a response message or other types of message according to the operation type field, and process the policy information according to the message type accordingly.

If the receiving end finds that the message is not to be transmitted to the receiving end itself, the receiving end can discard the message.

The policy information can be transmitted through the above-illustrated steps.

The procedure of obtaining the port information, issuing the QoS policy, transmitting the multicast authority information transmission, transmitting multicast copy information and issuing configuration maintenance information will be described in detail hereinafter; and the transmission of other policy information can be implemented by extending with reference to these examples.

1. Obtaining the Port Information of the Broadband User. The process includes the following steps.

(1) While detecting that the user logs in and is preparing to initiate an authentication request, a BRAS sends a port information request message to a DSLAM with the PITP. The message encapsulates the policy information transmission type field, the operation type field, the policy information content field; and the policy information transmission type is specified to be port information inquiry and the operation type is inquiry request, and the layer-2 MAC address of the inquired user is set inside the policy information content field.

(2) After confirming that the received message is a PITP port information request message, according to the information transmission type and the operation type, the DSLAM determines that the transmitting end sends the message to obtain the port information. The receiving end obtains the physical port information of the user according to the layer-2 MAC address of the user, encapsulates the physical port information of the specified user in the PITP response message and then returns the message to the BRAS.

Of course, besides the physical port information, the PITP response message should also include a policy information transmission type field and an operation type field. The physical port information is carried in the policy information content field. The policy information transmission type is specified to be port information inquiry and the operation type is inquiring confirmation. In addition, the physical port information of the user usually includes the frame, the slot and the port in the DSLAM corresponding to the user, and can further include the PVC or VLAN ID or other information between the user and the DSLAM.

Through the above process, the BRAS is able to obtain the physical port information of the user. So a binding relation between the user accounts and the user port information can be configured in a RADIUS Server; the BRAS sends the physical port information and account information of the user to the RADIUS Server with a RADIUS message; the RADIUS Server determines whether the binding relation between the received user account information and physical port information is the same as that pre-stored binding relation in the RADIUS Server, and further determines the validity of the user.

As a comparison, according to the existing authentication means of IP DSLAM networking mode, the account of the user is bound with the VLAN ID, and the RADIUS Server determines the validity of the user. Since there is insufficient number of VLAN ID, there may be no corresponding VLAN ID for each user port; it is impossible to bind the user port with the account one by one through the VLAN ID, which may lead to account intrusions and hacker attacks.

2. Issuing the QoS Policy.

In order to make a DSLAM able to obtain ACL rules or QoS policy information, and to implement the dynamic QoS policy adjustment in terms of the users, a BRAS can issue the ACL rule and the QoS policy information to a DSLAM with the PITP, so that DSLAM can conveniently obtain the ACL rule and QoS policy information and adjust the QoS policy dynamically in terms of the users. The specific process is as follows.

(1) After receiving the QoS policy information issued by a RADIUS Server or other policy servers, the BRAS updates the local policy information table of the user, and simultaneously encapsulates the QoS information of the user in the policy information content field of a PITP message and sends the message to the DSLAM corresponding to the user. The policy information transmission type in the message is QoS policy and the operation type is QoS issue.

The QoS policy information includes Bandwidth/Throughout, priority, ACL control policy information and so on; and the priority information can be obtained from Delay, Jitter and Loss Rate information.

(2) The DSLAM receives the PITP message sent by the BRAS, analyzes the message to obtain the QoS policy information and updates the user information table. Meanwhile, the DSLAM can return a PITP response message to the BRAS.

3. Issuing the Multicast Authority Information

The process of transmitting multicast authority information through the PITP is as follows.

(1) After a user is successfully authenticated, a RADIUS Server transmits the multicast authority information of the user to a BRAS;

The multicast authority information can include the multicast group that the user can join, and may further include the number of the multicast groups that the user can join and/or multicast sources that the user can visit and/or other information.

(2) The BRAS encapsulates the multicast authority information of the user in the policy information content field of a policy information transmission message and then sends the message to the broadband user access equipment corresponding to the user. The policy information transmission type in the message is multicast authority information and the operation type is multicast authority issue.

(3) The DSLAM receives the PITP message sent by the BRAS, analyzes the message to obtain the multicast authority information and updates the user information table. Optionally, the DSLAM can return a PITP response message to the BRAS.

After the above steps, if the user logs out, the BRAS will delete the multicast authority information of the user from the DSLAM with the PITP. The policy information transmission type field in the PITP message is multicast authority, the operation type field is multicast authority deletion and the information of policy information content field can be the multicast group that the user has left. Specific process is similar to the above-mentioned process of issuing the multicast authority.

In addition, if the user opens or sets other multicast authorities afterwards, i.e. if the user modifies the multicast authority, a similar process can be performed to change the multicast authority information of the user. The policy information transmission type field in the PITP message is multicast authority change, the operation type field is multicast authority change and the policy information content field includes the latest multicast authority information. The process is similar to the above-mentioned process of issuing or deleting the multicast authority.

4. Issuing the Multicast Copy Information.

The process of transmitting the multicast copy information through the PITP is as follows.

(1) When a user wants to watch a video program of a certain channel, the user initiates an IGMP join message;

(2) after receiving the IGMP join message initiated by the user, a BRAS checks the multicast authority information list of the user. If the user is authorized to watch the programs of the channel, the BRAS determines whether the video flow of the channel is already copied to the DSLAM where the user locates. If the video flow of the channel is not copied, the BRAS copies the video flow of the channel to the broadband user access equipment corresponding to the user; simultaneously, the BRAS encapsulates the multicast copy information of the user in a PITP message and then sends the message to the broadband user access equipment. The policy information transmission type in the message is multicast copy and the operation type is multicast copy information issue;

(3) The DSLAM receives the PITP message sent by the BRAS, analyzes the message to obtain the multicast copy information and updates the user information table. After obtaining the multicast copy information, the DSLAM can copy the corresponding video flow, which has been copied to the DSLAM by the BRAS, to the port corresponding to the user.

The multicast copy information can be issued through the above-mentioned three steps. The policy information transmission type field in the PITP message for deleting the multicast copy information is multicast copy, the operation type field is multicast copy information deletion and policy information content field is the multicast copy information that is to be deleted. The specific process of deleting the multicast copy information is basically the same as the process of issuing the multicast copy information.

5. Configuring the Maintenance Information.

There are two modes to manage the equipment: a network manager mode and a command line mode. In terms of these two modes, in accordance with an embodiment of the present invention, the PITP is run between a BRAS and a DSLAM to transmit the command line or network manager configuration information of the DSLAM, so that the DSLAM can be managed in the BRAS integrated, which makes it convenient to manage and maintain the DSLAM and saves the maintaining cost. Since the processes of the two modes are basically the same, only the specific process of the command line mode is illustrated below.

(1) Entering the configuring and managing mode for a certain DSLAM by selecting the DSLAM under the command line at a BRAS.

The configuring and managing mode of the DSLAM connected to the BRAS can be preset in the BRAS in terms of the DSLAM; or the BRAS can automatically discover the DSLAM according to the preset topology discovery protocol and starts the configuring and managing mode for the discovered DSLAM.

Before entering the configuring and managing mode, the BRAS needs to select the DSLAM to be processed. Specifically speaking, if the BRAS and the DSLAM are connected directly, the BRAS can select the DSLAM according to the physical port information directly; if the BRAS and the DSLAM are connected through a LAN Switch, the DSLAM will have an equipment ID as the identity, so that the BRAS can select the DSLAM with the equipment ID.

(2) When the BRAS needs to configure/manage a certain DSLAM, the BRAS will pack the corresponding command line configuration information to a PITP message and transmit the message to the specified DSLAM through the PITP.

The command line configuration information is usually data parameters, which are put into the policy information content field of the message; the policy information transmission type field in the PITP message is configuration maintenance, and the operation type field can be data configuration and/or data inquiry and so on.

(3) The DSLAM analyzes the PITP configuration message, extracts the operation type and the data parameters, and completes the data configuration or data inquiry according to the operation type. The configuration or the inquiry result will be returned to the BRAS with a PITP response message.

The response message also needs to include a policy information transmission type field, an operation type field and a policy information content field. The policy information transmission type field is also configuration maintenance, the operation type field can be data configuration response and/or data inquiry result. The corresponding data configuration response information and/or the data inquiry result information are set in the policy information content field.

Through the above-mentioned three steps, the configuration maintenance information is processed accordingly.

It can be seen from the above description that, the PITP can be used to transmit the physical port information, the bandwidth information, the QoS policy information, the ACL control policy information, the multicast authority or copy information and the user data configuration or maintenance information and so on. The information that the PITP bears includes but is not limited to the above-mentioned information. The PITP is independent from any other protocols, and can be applied separately or together with other protocols to complete a certain function. The PITP can be implemented through a point-to-point means or a broadcast means in layer-2, the policy information can also be obtained or transmitted through a unicast means or a broadcast means in a layer-3 or a higher application layer. No matter in which layer the adopted protocol is, the protocol type of the messages in the corresponding layer need to be extended so as to define a new protocol message to bear the content of the PITP.

According to the embodiments of the present invention, the problem of insufficient IP-uplink VLAN ID in the IP DSLAM is solved so that user account intrusions and hacker attacks are prevented; the DSLAM can obtain the bandwidth and QoS policy information while implementing the QoS function; the multicast authority information can be issued to the DSLAM uniformed from the RADIUS Server; the problem of severe bandwidth waste, which is because that the BRAS has to copy the multicast flow for users when the DSLAM does not support the IGMP, is solved. Moreover, the uniform management upon the DSLAM can be implemented conveniently. The solution in accordance with the embodiments of the invention can be applied to other policy information that is to be transmitted between a DSLAM and a BRAS.

The IP-uplink broadband user access equipment has been illustrated with the example of the DSLAM, if the broadband user access equipment adopts a layer-2 switch, just as the DSLAM, the layer-2 switch can be connected to the BRAS directly or be aggregated to the BRAS through a LAN Switch. So the embodiments of the present invention can also be applied for the policy information transmission between a layer-2 switch and a BRAS, and the transmitting means is the same as the transmitting means of the above embodiments.

It should be understood by those skilled in the art that, there can be many kinds of equivalent solutions without departing from the spirit of the present invention and that the above illustration is just preferable embodiments of the invention without confining the claim scope of the invention. Any equivalent structure change upon the claims and accompanying drawings of the present invention should be comprised in the present invention's claims.

What is claimed is:

1. A method for transmitting policy information between network equipment, characterized in that the method comprises:
   transmitting, by a Broadband Remote Access Server (BRAS), the policy information to a broadband user access equipment with a protocol message;
   receiving, by the broadband user access equipment, the protocol message sent for the broadband user access equipment; and performing, by the broadband user access equipment, processes based on the policy information in the received protocol message, wherein the protocol message comprises: a policy information transmission type field for distinguishing policy information transmission types, an operation type field for distinguishing operation types, and a policy information content field for bearing the policy information.

2. A method for transmitting policy information between network equipment, comprising:

adding a Policy Information Transfer Protocol (PITP) type by extending protocol types of protocol messages on a layer between broadband user access equipment and a Broadband Remote Access Server (BRAS);

transmitting, by a requester, the policy information to a responder with a PITP message; and confirming, by the responder the received message is the PITP message sent to the responder, and obtaining the policy information in the PITP message, wherein the PITP message comprises: a policy information transmission type field for distinguishing policy information transmission types, an operation type field for distinguishing operation types, and a policy information content field for bearing the policy information, wherein the policy information is physical port information of a user, the requester is the BRAS, and the responder is the broadband user access equipment, wherein the method, before the step of the requester transmitting the policy information to the responder with a PITP message, further comprises: the BRAS detecting that the user logs in and the user is preparing or starting to initiate an authentication request, wherein the step of the requester transmitting the policy information to the responder with a PITP message comprises:

the BRAS setting the policy information transmission type field of the PITP message to be port information inquiry, setting the operation type field to be inquiry request, setting a layer-2 MAC address of the inquired user in the policy information content field; and the BRAS sending the PITP message to the broadband user access equipment, wherein the step of the responder obtaining the policy information in the PITP message comprises: after finding that the policy information transmission type field is port information inquiry and the operation type field is inquiry request, the broadband user access equipment obtaining the layer-2 MAC address of the inquired user from the policy information content field of the message, and wherein the method, after the step of the responder obtaining the policy information in the PITP message, further comprises:

according to the layer-2 MAC address of the inquired user, the broadband user access equipment obtaining the physical port information of the user;

the broadband user access equipment sending to the BRAS a PITP message, in which the policy information transmission type field is set to be port information inquiry, the operation type field is set to be inquiry confirmation, and the policy information content field comprises the obtained physical port information of the user;

the BRAS confirming that the received message is a PITP message sent to the BRAS; and after finding that the policy information transmission type field is port information inquiry and the operation type field is inquiry confirmation, the BRAS obtaining the physical port information of the user from the policy information content field of the PITP message.

3. The method according to claim 2, wherein the physical port information of the user comprises; the frame, slot and port of the broadband user access equipment where the user locates; or further comprises: information about PVC or VLAN ID between the user and DSLAM.

4. A method for transmitting policy information between network equipment, comprising:

adding a Policy information Transfer Protocol (PITP) type by extending protocol types of protocol messages on a layer between broadband user access equipment and a Broadband Remote Access Server (BRAS);

transmitting, by a requester, the policy information to a responder with a PITP message; and confirming, by the responder, that the received message is the PITP message sent to the responder, and obtaining the policy information in the PITP message, wherein the PITP message comprises: a policy information transmission type field for distinguishing policy information transmission types, an operation type field for distinguishing operation types and a policy information content field for bearing the policy information, wherein the policy information is configuration maintenance information, the requester is the BRAS, and the responder s the broadband user access equipment, wherein the method, before the step of the requester transmitting the policy information to the responder with a PITP message, further comprises: the BRAS entering the configuring and managing mode for the broadband user access equipment that is to be configured and maintained, wherein the step of the requester transmitting the policy information to the responder with a PITP message comprises:

the BRAS setting the policy information transmission type field of the PITP message to be configuration maintenance, setting the operation type field to be data configuration and/or data inquiry, setting the configuration maintenance information in the policy information content field; and the BRAS sending the PITP message to the broadband user access equipment, wherein the step of the responder obtaining the policy information in the PITP message comprises: after finding that the policy information transmission type field is configuration maintenance and the operation type field is data configuration and/or data inquiry, the broadband user access equipment obtaining the configuration maintenance information from the policy information content field of the message, wherein the method, after the step of the responder obtaining the policy information in the PITP message, further comprises:

the broadband user access equipment completing the data configuration and/or data inquiry according to the configuration maintenance information;

the broadband user access equipment returning to the BRAS a PITP response message, in which the policy information transmission type field is configuration maintenance, the operation type field is data configuration response and/or data inquiry result, and the policy information content field comprises the data configuration response information and/or the data inquire result information; and after finding that the policy information transmission type field in the PITP response message is configuration maintenance and the operation type field is data configuration response and/or data inquiry result, the BRAS obtaining the data configuration response information and/or the data inquiry result information from the policy information content field.

5. The method according to claim 4, wherein the BRAS is directly connected to the broadband user access equipment,
wherein the step of the BRAS entering the configuring and managing mode for the broadband user access equipment that is to be configured and maintained comprises:
according to the physical port information of the broadband user access equipment, the BRAS selecting the corresponding broadband user access equipment and entering the configuring and managing mode for the broadband user access equipment; or
the BRAS is connected to the broadband user access equipment through the LAN Switch, and the broadband user access equipment is identified by an equipment identity, and
wherein the step of the BRAS entering the configuring and managing mode for the broadband user access equipment that is to be configured and maintained comprises: according to the equipment identity of the broadband user access equipment, the BRAS selecting the corresponding broadband user access equipment and entering the configuring and managing mode for the broadband user access equipment.

6. The method according to claim 1, wherein the policy information is physical port information of a user;
wherein the step of transmitting by a BRAS the policy information to a broadband user access equipment with a protocol message comprises: transmitting, by the BRAS, the policy information comprising the physical port information of an inquired user to the broadband user access equipment with the protocol message,
wherein the step of performing by the broadband user access equipment processes based on the policy information in the received protocol message comprises;
obtaining, by the broadband user access equipment, the layer-2 media access control (MAC) address of the inquired user from the policy information content field of the protocol message;
obtaining, by the broadband user access equipment, the physical port information of the inquired user according to the obtained layer-2 MAC address of the inquired user; and
returning, by the broadband user access equipment, a response message comprising the obtained physical port information of the inquired user to the BRAS for the received protocol message, and
wherein the policy information transmission type field of the protocol message is port information inquiry, the operation type field of the protocol message is inquiry request, and the policy information content field of the protocol message is a layer-2 MAC address of the inquired user.

7. The method according to claim 1, wherein the policy information is Quality of Service (QoS) policy information,
wherein the step of transmitting by a BRAS the policy information to a broadband user access equipment with a protocol message comprises: transmitting, by the BRAS, the policy information comprising the QoS policy information to the broadband user access equipment with the protocol message,
wherein the step of performing by the broadband user access equipment processes based on the policy information in the received protocol message comprises:
obtaining, by the broadband user access equipment, the QoS policy information from the policy information content field of the protocol message; performing, by the broadband user access equipment, configuration for a corresponding user; and returning, by the broadband user access equipment, a response message for the received protocol message to the BRAS, and
wherein the policy information transmission type field of the protocol message is QoS policy, the operation type field of the protocol message is QoS issue, the policy information content field of the protocol message is the QoS policy information.

8. The method according to claim 1, wherein the policy information multicast authority information,
wherein the step of transmitting by a BRAS the policy information to a broadband user access equipment with a protocol message comprises: transmitting, by the BRAS, the policy information comprising the multicast authority information to the broadband user access equipment with the protocol message,
wherein the step of performing by the broadband user access equipment processes based on the policy information in the received protocol message comprises:
obtaining, by the broadband user access equipment, the multicast authority information from the policy information content field of the protocol message; performing configuration, by the broadband user access equipment and returning, by the broadband user access equipment, a response message to the BRAS for the received protocol message, and
wherein the policy information transmission type field of the protocol message is multicast authority, the operation type field of the protocol message is multicast authority issue, and the policy information content field of the protocol message is the multicast authority information.

9. The method according to claim 8, further comprising;
after confirming that the user logs out, transmitting, by the BRAS, the policy information comprising the multicast authority deletion to the broadband user access equipment with the protocol message; and
after receiving the protocol message sent for the broadband user access equipment, obtaining, by the broadband user access equipment, the multicast authority deletion information from the policy information content field of received protocol message, and deleting the multicast authority of the user stored in the equipment according to the multicast authority deletion information,
wherein the policy information transmission type field of the protocol message is multicast authority, the operation type field of the protocol message is multicast authority deletion and the policy information content field of the protocol message comprises multicast authority deletion information.

10. The method according to claim 9, further comprising:
after receiving the multicast authority modification information of the user, transmitting, by the BRAS, the policy information comprising the multicast authority modification to the broadband user access equipment with the protocol message; and
after receiving the protocol message sent for the broadband user access equipment, obtaining, by the broadband user access equipment, the changed multicast authority information of the user from the policy information content field of the received protocol message, and updating the multicast authority of the user stored in the equipment according to the changed multicast authority information, wherein the policy information transmission type field of the protocol message is multicast authority, the operation type field of the protocol message is multicast authority modification and the policy information content field of the protocol message comprises the changed multicast authority information.

11. The method according to claim 1, wherein the policy information is multicast copy information, wherein the step of transmitting by a BRAS the policy information to a broadband user access equipment with a protocol message comprises: transmitting, by the BRAS, the policy information comprising the multicast copy information to the broadband user access equipment with the protocol message, wherein the step of performing by the broadband user access equipment processes based on the policy information in the received protocol message comprises: obtaining, by the broadband user access equipment, the multicast copy information from the policy information content field of the received protocol message; performing configuration, by the broadband user access equipment and returning, by the broadband user access equipment, a response message to the BRAS for the received protocol message, and wherein the policy information transmission type field of the protocol message is multicast copy, the operation type field of the protocol message is multicast copy information issue, and the policy information content field of the protocol message is the multicast copy information of the video programs.

12. The method according to claim 11, further comprising:

after confirming that the user logs out, transmitting, by the BRAS, the policy information comprising multicast copy information deletion to the broadband user access equipment with a protocol message; and after receiving the protocol message sent for the broadband user access equipment, obtaining, by the broadband user access equipment, the multicast copy deleted information from the policy information content field of the received protocol message, and deleting the multicast authority stored in the equipment according to the multicast copy deleted information, wherein the policy information transmission type field of the protocol message is multicast copy, the operation type field of the protocol message is multicast copy information deletion and the policy information content field of the protocol message comprises multicast copy deleted information.

13. The method according to claim 1, wherein the policy information is configuration maintenance information, wherein the step of transmitting by a BRAS the policy information to a broadband user access equipment with a protocol message comprises: transmitting, by the BRAS, the policy information comprising the configuration maintenance information to the broadband user access equipment with the protocol message, wherein the step of performing by the broadband user access equipment processes based on the policy information in the received protocol message comprises:

obtaining, by the broadband user access equipment, the configuration maintenance information from the policy information content field of the received protocol message;

completing, by the broadband user access equipment, the data configuration and/or data inquiry according to the obtained configuration maintenance information; and returning, by the broadband user access equipment, a response message comprising the data configuration response information and/or the data inquire result information to the BRAS for the received protocol message, wherein the policy information transmission type field of the protocol message is configuration maintenance, the operation type field of the protocol message is data configuration and/or data inquiry, and the policy information content field of the protocol message is information about configuration maintenance, and wherein the policy information transmission type field of the response message for the received protocol message is configuration maintenance, the operation type field of the response message for the received protocol message is data configuration response and/or data inquiry result, and the policy information content field of the response message for the received protocol message comprises the data configuration response information and/or the data inquire result information.

14. The method according to claim 13, before the step of transmitting by a BRAS the policy information to a broadband user access equipment with a protocol message, further comprising: entering, by the BRAS, the configuring and managing mode for the broadband user access equipment that is to be configured and maintained.

15. The method according to claim 14, wherein the BRAS is directly connected to the broadband user access equipment, wherein the step of entering, by the BRAS, the configuring and managing mode for the broadband user access equipment that is to be configured and maintained comprises:

according to the physical port information of the broadband user access equipment, selecting, by the BRAS, the corresponding broadband user access equipment and entering the configuring and managing mode for the broadband user access equipment; or the BRAS is connected to the broadband user access equipment through a Local Area Network (LAN) Switch, and the broadband user access equipment is identified by an equipment identity, and wherein the step of entering, by the BRAS, the configuring and managing mode for the broadband user access equipment that is to be configured and maintained comprises: according to the equipment identity of the broadband user access equipment, selecting, by the BRAS, corresponding broadband user access equipment and entering the configuring and managing mode for the broadband user access equipment.

16. The method according to claim 1, wherein the protocol message is achieved by extending the protocol types of protocol messages in layer-2 with a point-to-point means or a layer-2 broadcast means; or wherein the protocol message is achieved by extending the protocol types of protocol messages in layer-3 or a higher layer with a unicast means or a broadcast means.

17. The method according to claim 1, wherein a point-to-point means is adopted between the broadband user access equipment and the BRAS, wherein address information of the broadband user access equipment is set in the message header of the protocol message sent by the BRAS, and wherein receiving by the broadband user access equipment the protocol message sent for the broadband user access equipment comprises;

confirming that the message is a protocol message through the protocol type information in the message header; and confirming that the protocol message is to be transmitted to the broadband user access equipment by confirming that the address information in the protocol message header is the address information of the broadband user access equipment.

18. The method according to claim 1, wherein a broadcast means is adopted between the broadband user access equipment and the BRAS, wherein address information of a user is set in a policy information content field of the protocol message transmitted by the BRAS, and wherein the step of receiving by the broadband user access equipment the protocol message sent for the broadband user access equipment comprises:

confirming that the message is a protocol message through the protocol type information in the message header; and confirming that the protocol message is the message to be transmitted to the broadband user access equipment by confirming that the address information, of the user in the policy information content field is a broadband address information belonging to the broadband user access equipment.

19. The method according to claim 1, wherein the broadband user access equipment is aggregated to the BRAS through a Local Area Network (LAN) Switch, and wherein the method further comprises: setting an equipment identity for each piece of broadband user access equipment, and wherein the step of transmitting by a BRAS the policy information to a broadband user access equipment with a protocol message comprises:

transmitting, by the BRAS, the protocol message comprising the equipment identity to the LAN Switch; and transmitting, by the LAN Switch, the protocol message to the broadband user access equipment corresponding to the equipment identity.

20. The method according to claim 1, wherein before the step of transmitting the policy information to the broadband user access equipment with the protocol message, the method farther includes:

receiving, by the BRAS, the policy information from a policy server; and generating, by the BRAS, operation types identifying the operation the broadband user access equipment can perform to the policy information, and wherein the step of performing, by the broadband user access equipment, processes based on the policy information in the received protocol message includes: performing, by the broadband user access equipment, operation to the policy information according to the operation type contained in the operation type field.

* * * * *